June 3, 1958  R. PIROMALLI  2,836,916
COMBINED FRAME HOLDER AND PERFORATED OBJECT
Filed Oct. 4. 1954
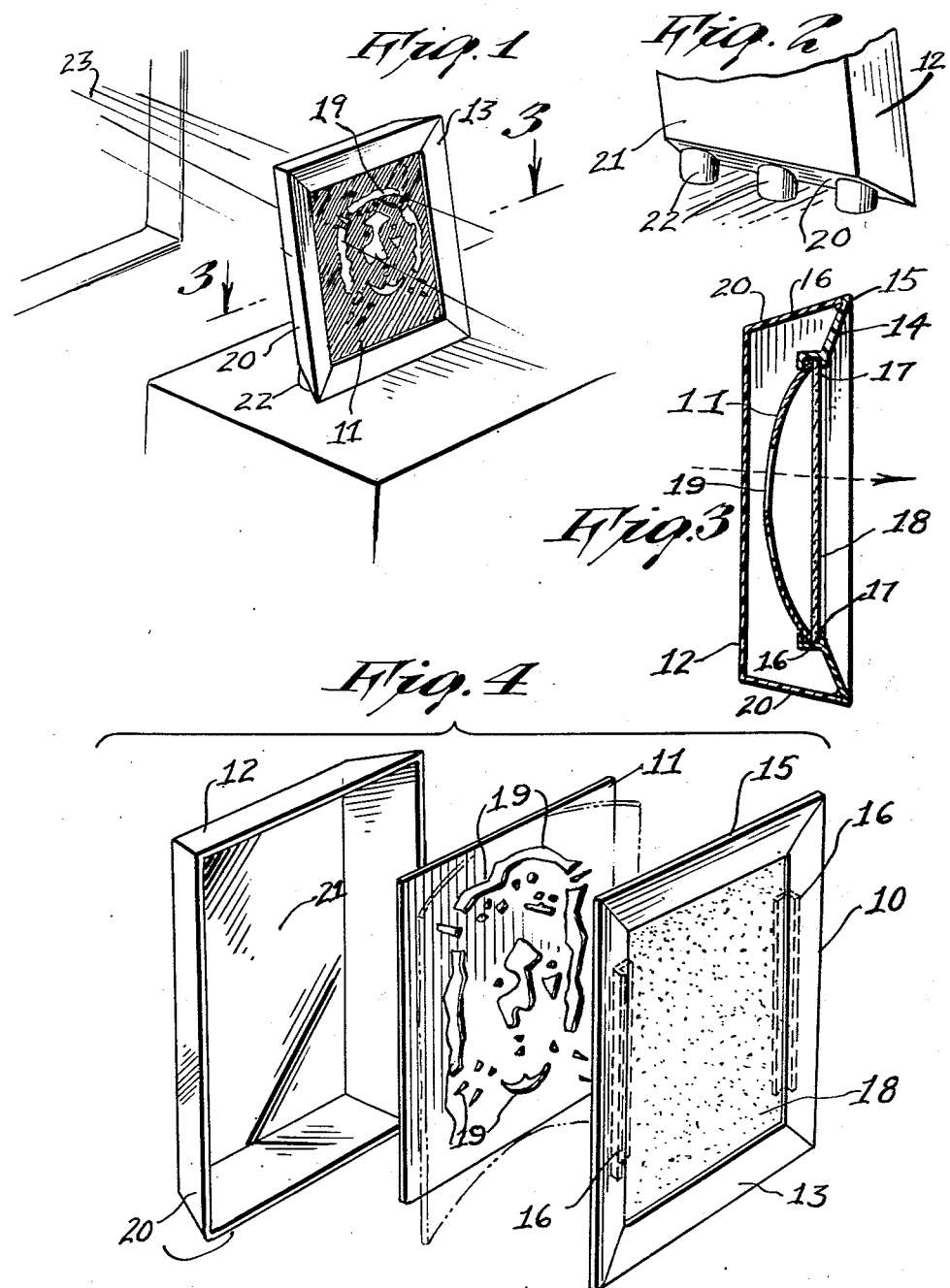
INVENTOR.
ROCCO PIROMALLI
BY
Carl Miller
ATTORNEY

2,836,916

COMBINED FRAME HOLDER AND PERFORATED OBJECT

Rocco Piromalli, Hollis, N. Y.

Application October 4, 1954, Serial No. 459,989

1 Claim. (Cl. 40—152.2)

This invention relates to a picture frame especially adapted to produce a light formed image.

The conventional planar mounting for pictures, drawings, etc. does not properly introduce a realistic three dimensional effect, and is thereby limited aesthetically. Moreover, the depicted objects, scenes, people, etc. are created by contrasting configurations of colors deposited by various conventional means upon a planar background. With the passage of time the colors deteriorate, decreasing the aesthetic qualities. Moreover, a good painting, drawing, etc. is expensive, requiring the services of a highly skilled artist. However, despite the skill of the artist, it is impossible to fully portray the three-dimensional nature of natural scenes with perspective projections on planar surfaces. Especially in the ecclesiastical domain is the three-dimensional effect important. Images having a full depth illusion are more striking to the eye, and consequently are more effective in introducing the desired effect of solemnity.

Consequently, it is the primary inventive object to provide a three-dimensional image in an especially constructed frame which can be created inexpensively, wherein light is contrasted against adjacent opaque material to form the desired image.

A further inventive object is the provision of an image formed within a picture frame by contrasting white light against an adjacent opaque material retained within the frame in a three-dimensional fashion.

A still further inventive object is the provision of a three-dimensional image within a picture frame, wherein the image is created by a perforated opaque material and a light source casting rays through the perforations, whereby the illuminated perforations contrasted against the darker material produce a three-dimensional pictorial effect especially adaptable to ecclesiastical scenes and characters.

It is quite apparent from the recited objects that no expensive paintings are herein involved, thereby permitting a universal distribution of the novel frame.

Further objects and inventive details will become apparent from the following detailed description, when taken in conjunction with the attached drawings, in which:

Figure 1 is a perspective view of the frame in operative condition.

Figure 2 is a partial rear perspective of the lower frame portion.

Figure 3 is a section through 3—3 of Figure 1.

Figure 4 is an exploded perspective of the component parts of the novel frame.

Referring to Figure 4, the frame assembly is seen to comprise a picture holder 10, a perforate picture forming insert 11, and the transparent rear closure housing 12. The holder 10 (see Figure 3) further comprises the peripheral frame 13 having the inclined surfaces 14 projecting inwardly in the fashion of a truncated pyramid. The inner perimeter is thereby axially recessed from the outer perimeter edge 15. Projecting further axially inward are the insert holding channels 16 including the spaced opposing parallel grooves 17. Grooves 17 are sufficiently wide to receive both the frosted glass diffusing screen 18 and the insert 11. It should be further noted that the transverse spacing of channels 16 is less than the corresponding insert dimension, whereby the said insert assumes a non-planar shape with the central areas of the insert being variably displaced axially from the insert edges fitting within the channels 16. The perforations 19 in the insert 11 are spaced and shaped in a particular pattern to cause the creation of some desired image in conjunction with a light source, as is to be disclosed. The assembly is completed by the housing 12 which snugly fits about the perimeter 15 of the frame 13 in a retaining fashion. Any conventional means for securing the housing 12 to the frame 13 may be used without affecting the novel combination otherwise involved herein.

The sides 20 of the housing 12 are of an opaque material, whereas the rear end 21 is transparent. The sides 20 are dimensioned deep enough to axially space the transparent end 21 sufficiently from the innermost portion of the insert 11. Referring to Figure 2, it is seen that the housing 12 is provided with the short stubs 22 projecting from the lower side 20 forming a supporting means therefor.

In use, light coming from a source such as 23 (Figure 1) passes through the frosted glass 18. The observer looking at the frame sees the relative bright areas at the perforations contrasted against the darker areas of the insert material. By cutting out properly shaped perforations, any desired image can be created. Since the picture forming contrast between light and dark areas is a function of the shape of the perforated shapes, any desired picture or image can be created. Furthermore, due to the non-planar shape of the insert, a true three-dimensional quality is injected into the image illusion. It is quite difficult to be conscious of the effect above described by merely projecting one's imagination. To fully realize the aesthetic impact produced by the disclosed picture frame, it is almost mandatory that the image be personally viewed. However, it is apparent that lighting effects not attainable by colors deposited on a planar or curved surface are herein possible.

Obviously, the scope is not limited to the use of frosted glass for the frame 13; the glass 18 can be eliminated or replaced with wax paper, tinted glass, plain glass, etc. The transparency and/or coloration of the end 21 can also be varied to suit one's desires.

Again it must be emphasized that the aesthetic creations are herein attainable inexpensively, due to the simplicity of construction and materials. For example, the frame and housing can be made from sheet metal, tin, aluminum, wood, plastic etc., and the insert from any flexible material. If one desires, color variations can be introduced on the surface of the insert.

It is apparent now that the instant picture frame provides a three-dimensional image of novel aesthetic qualities, lending itself to inexpensive fabrication, and possessing artistic durability. Consequently, the cited objects are hereinabove fulfilled.

It should be further realized that the many obtainable species resulting from changes in insert size, perforation configuration, color, material or rearrangements of the component parts of the device, fall within the inventive scope.

Having thus described the nature of the invention, what is claimed as new is:

A picture frame including a rectangular frame of predetermined depth, a substantially transparent rear panel secured to the rear side of the frame, a peripheral frame forming a picture holder having inwardly inclined sides, top and bottom secured to the front edges of said rectangular frame, a translucent diffusing screen secured to the peripheral frame and occupying the open area therein, a pair of insert holding channels secured upon two opposite inner edges of the peripheral frame within said translucent screen, and an arcuate opaque intermediate panel comprising a removable insert fitting with two opposite edges in the insert holding channels and having a plurality of mutually related openings therein defining a negative picture outline, whereby light passing through the mentioned openings from said intermediate panel projects a shadow upon said screen of said peripheral frame.

References Cited in the file of this patent

UNITED STATES PATENTS

| | | |
|---|---|---|
| 589,173 | Henke | Aug. 31, 1897 |
| 750,711 | Shea | Jan. 26, 1904 |
| 1,490,815 | Fleming | Apr. 15, 1924 |
| 1,619,096 | Walsh | Mar. 1, 1927 |
| 2,048,365 | Agate | July 21, 1936 |
| 2,173,939 | Hall | Sept. 26, 1939 |
| 2,565,553 | Foley | Aug. 28, 1951 |
| 2,580,164 | Flynn | Dec. 25, 1951 |

FOREIGN PATENTS

| | | |
|---|---|---|
| 473,192 | Germany | Mar. 12, 1929 |